US008833569B2

(12) United States Patent
Clarkson

(10) Patent No.: US 8,833,569 B2
(45) Date of Patent: Sep. 16, 2014

(54) LID HOLDER DEVICE

(76) Inventor: Scott A Clarkson, Auburn, CA (US)

(*) Notice: Subject to any disclaimer, the term of this patent is extended or adjusted under 35 U.S.C. 154(b) by 91 days.

(21) Appl. No.: 13/457,538

(22) Filed: Apr. 27, 2012

(65) Prior Publication Data

US 2012/0273440 A1 Nov. 1, 2012

Related U.S. Application Data

(60) Provisional application No. 61/480,918, filed on Apr. 29, 2011.

(51) Int. Cl.
*A47G 19/08* (2006.01)
*A47F 5/00* (2006.01)
*A47J 47/16* (2006.01)
*A47B 81/04* (2006.01)
*A47L 19/00* (2006.01)

(52) U.S. Cl.
CPC ............... *A47J 47/16* (2013.01); *A47B 81/04* (2013.01); *A47L 19/00* (2013.01)
USPC .................. 211/41.11; 211/14; 211/41.2

(58) Field of Classification Search
CPC ......... A47L 19/00; A47L 19/04; A47J 47/16; A47J 43/287; A47J 45/02; A47J 47/00; A47J 47/20; A47J 45/10; A47G 19/28; A47G 19/04; A47G 21/145; A47G 19/30; A47G 19/08; A63B 71/0045; A63B 47/00; A63B 47/001; A47B 77/14; A47B 81/04
USPC .......... 211/41.11, 14, 13.1, 183, 41.2, 71.01, 211/70.7, 41.1; 206/315.9; 220/508; D7/500, 601, 637, 611, 707; 248/176.2, 176.1, 213.2, 200, 37.3, 248/37.6
See application file for complete search history.

(56) References Cited

U.S. PATENT DOCUMENTS

| | | | | |
|---|---|---|---|---|
| 27,095 | A * | 2/1860 | Batty | 211/14 |
| 222,961 | A * | 12/1879 | Tattersley | 99/440 |
| 309,049 | A * | 12/1884 | Hervey | 211/14 |
| 463,604 | A * | 11/1891 | Iske | 211/14 |
| 527,999 | A * | 10/1894 | Leach | 211/14 |
| 559,527 | A * | 5/1896 | Heilborn | 211/14 |
| 898,007 | A * | 9/1908 | Rowe | 217/24 |
| 1,362,023 | A * | 12/1920 | McCormick | 211/14 |
| 1,386,078 | A * | 8/1921 | Schulze | 211/14 |
| D71,116 | S * | 9/1926 | Paye | D7/559 |
| 1,720,115 | A * | 7/1929 | Barnes | 211/14 |
| 2,054,934 | A * | 9/1936 | Graffenberger | 229/400 |
| 2,108,594 | A * | 2/1938 | Nelson | 72/324 |
| 2,617,280 | A * | 11/1952 | Anderson | 211/14 |
| D168,690 | S * | 1/1953 | Kalt | D7/503 |
| D192,531 | S * | 4/1962 | Guillaumant | D7/601 |
| 3,028,972 | A * | 4/1962 | Guillaumant | 211/41.11 |
| 3,326,387 | A * | 6/1967 | Princevalle | 211/41.11 |

(Continued)

*Primary Examiner* — Jennifer E Novosad
(74) *Attorney, Agent, or Firm* — Michael Ries

(57) ABSTRACT

A lid holder device is disclosed. The lid holder device includes a cupped holding portion that has a bottom collection portion and 4 curved indentures that are positioned to hold and accommodate a pot lid and one or more other kitchen utensils in an upright position to collect and contain condensation and material from the pot lid and the one or more other kitchen utensils and a base is attached and disposed underneath the bottom collection portion of the cupped holding portion to support the cupped holding portion, wherein the cupped holding portion and the base form the lid holder device into one piece.

1 Claim, 2 Drawing Sheets

(56) References Cited

U.S. PATENT DOCUMENTS

| | | | |
|---|---|---|---|
| 3,497,118 A * | 2/1970 | Najjar | 224/196 |
| 4,911,310 A * | 3/1990 | Raishe et al. | 211/41.2 |
| 5,127,616 A * | 7/1992 | Carney | 248/176.2 |
| D379,903 S * | 6/1997 | Durham | D7/601 |
| D401,811 S * | 12/1998 | Hait | D7/601 |
| 6,053,335 A * | 4/2000 | Rutter | 211/14 |
| 6,131,746 A * | 10/2000 | Huang | 211/41.11 |
| D491,769 S * | 6/2004 | Qualiano | D7/601 |
| 7,025,312 B1 * | 4/2006 | Dare | 248/176.1 |
| 7,815,057 B2 * | 10/2010 | Bush | 211/68 |
| 8,091,845 B2 * | 1/2012 | Di Lollo | 248/213.2 |
| 2003/0213759 A1 * | 11/2003 | Compagnucci | 211/41.11 |
| 2012/0273440 A1 * | 11/2012 | Clarkson | 211/41.11 |

* cited by examiner

US 8,833,569 B2

LID HOLDER DEVICE

This application claims priority to U.S. Provisional Application 61/480,918 filed on Apr. 29, 2011, the entire disclosure of which is incorporated by reference.

TECHNICAL FIELD & BACKGROUND

Condensation from a pot or a pan lid or other kitchen utensil such as a spatula or a ladle can cause a mess if the pot or a pan lid or other kitchen utensil is set down while a user is cooking.

The present invention generally relates to a utensil holding device. More specifically, the invention is a lid holder device.

It is an object of the invention to provide a lid holder device that can also hold a pot or a pan lid or other kitchen utensil such as a spatula or a ladle while a user is cooking.

It is an object of the invention to provide a lid holder device that can also hold a pot or a pan lid or other kitchen utensil to collect and contain condensation and material on the pot lid or pan lid or other kitchen utensil that is on the held pot or pan lid or other kitchen utensil.

It is an object of the invention to provide a lid holder device that can hold a plurality of different sized pot or pan lids or other kitchen utensils.

What is really needed is a lid holder device that can also hold a pot or a pan lid or other kitchen utensil such as a spatula or a ladle while a user is cooking that can also hold a pot or a pan lid or other kitchen utensil to collect and contain condensation and material on the pot lid or pan lid or other kitchen utensil that is on the held pot or pan lid or other kitchen utensil that can hold a plurality of different sized pot or pan lids or other kitchen utensils.

BRIEF DESCRIPTION OF THE DRAWINGS

The present invention will be described by way of exemplary embodiments, but not limitations, illustrated in the accompanying drawings in which like references denote similar elements, and in which.

DETAILED DESCRIPTION OF ILLUSTRATIVE EMBODIMENTS

Various aspects of the illustrative embodiments will be described using terms commonly employed by those skilled in the art to convey the substance of their work to others skilled in the art. However, it will be apparent to those skilled in the art that the present invention may be practiced with only some of the described aspects. For purposes of explanation, specific numbers, materials and configurations are set forth in order to provide a thorough understanding of the illustrative embodiments. However, it will be apparent to one skilled in the art that the present invention may be practiced without the specific details. In other instances, well-known features are omitted or simplified in order not to obscure the illustrative embodiments.

Various operations will be described as multiple discrete operations, in turn, in a manner that is most helpful in understanding the present invention, however, the order of description should not be construed as to imply that these operations are necessarily order dependent. In particular, these operations need not be performed in the order of presentation.

The phrase "in one embodiment" is used repeatedly. The phrase generally does not refer to the same embodiment, however, it may. The terms "comprising", "having" and "including" are synonymous, unless the context dictates otherwise.

Figure 1A:
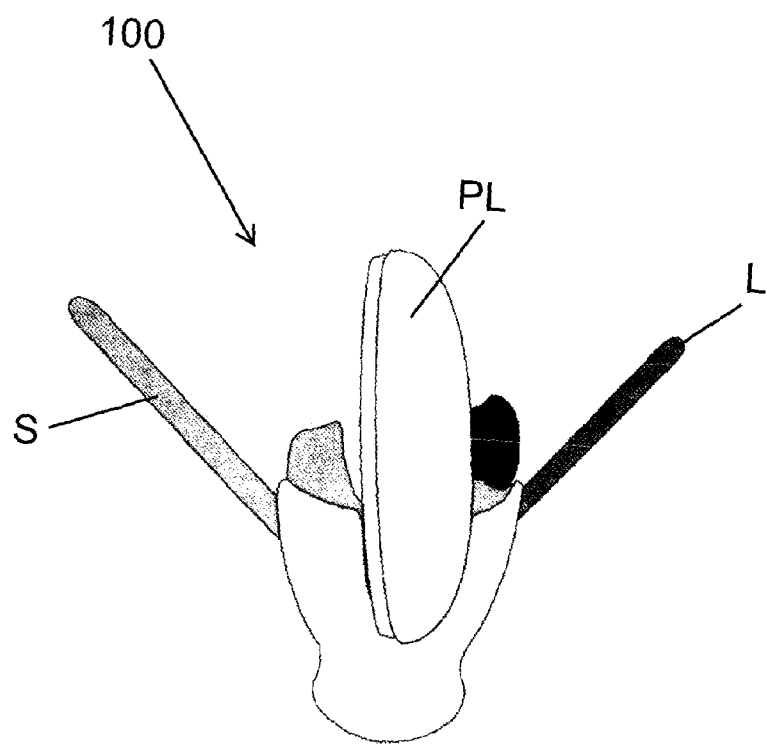
FIG. 1A illustrates an environmental front perspective view of a lid holder device, in accordance with one embodiment of the present invention.

FIG. 1A illustrates an environmental front perspective view of a lid holder device 100, in accordance with one embodiment of the present invention. The lid holder device 100 illustrated in FIG. 1A is holding a pot lid PL, a ladle L and a spatula S in an upright position to collect and contain condensation and material on the pot lid PL, the ladle L and the spatula S that can drip down from the hot pot lid PL, the ladle L and the spatula S when the pot lid PL, the ladle L and the spatula S is not in use. The lid holder device 100 can also hold any other suitable kitchen utensil in an upright position to collect and contain condensation that can drip down. This can occur when a user is cooking and sets down a hot pot lid PL, a ladle L and/or a spatula S when these items are not being utilized. The lid holder device 100 can provide a suitable alternative to a user from setting a hot pot lid PL, a ladle L and/or a spatula S on a countertop and prevent having condensation or other material on the hot pot lid PL, the ladle L or the spatula S from dripping onto the countertop.

Figure 1B:
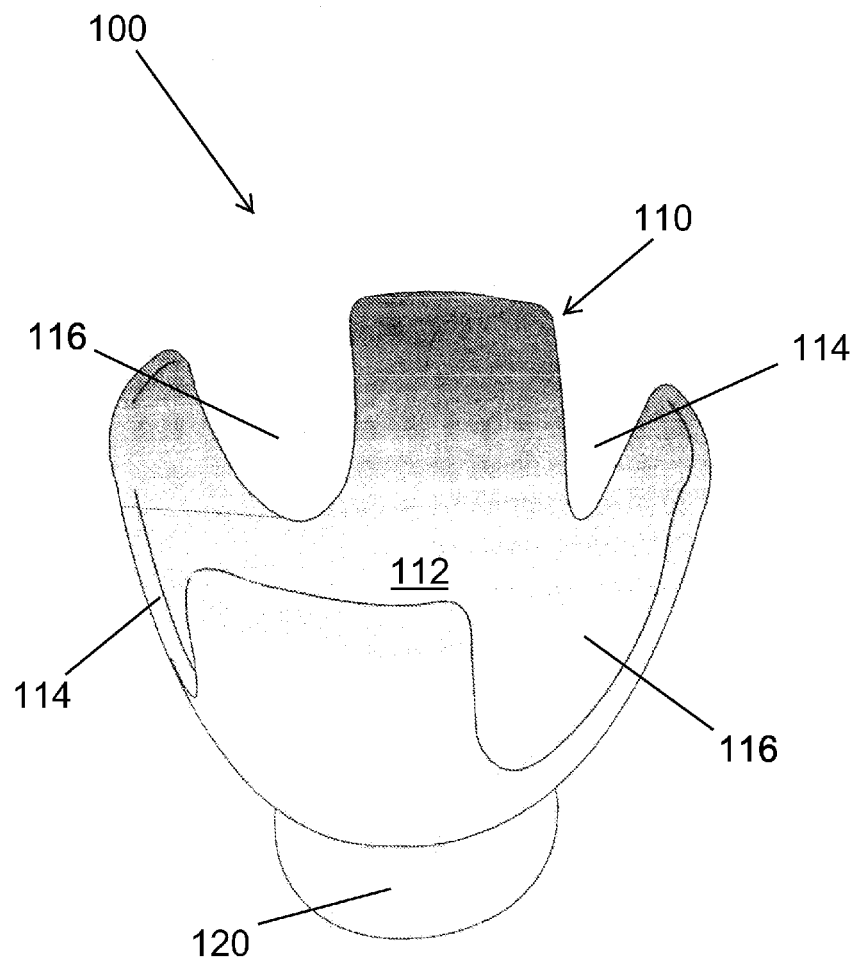
FIG. 1B illustrates a front perspective view of a lid holder device, in accordance with one embodiment of the present invention.

FIG. 1B illustrates a front perspective view of a lid holder device 100, in accordance with one embodiment of the present invention.

The lid holder device 100 includes a cupped holding portion 110 and a base 120. The cupped holding portion 110 has a bottom collection portion 112 and a plurality of curved indentures 114 that are positioned to hold and accommodate a pot lid PL and other suitable kitchen utensils such as a ladle L and a spatula S in an upright position to collect and contain condensation and material on the pot lid PL, the ladle L and the spatula S that can drip down from the hot pot lid PL, the ladle L and the spatula S and collect on the bottom collection portion 112 of the cupped holding portion 110 when the pot lid PL, the ladle L and the spatula S are not in use. FIG. IB illustrates the curved indentures 114. The cupped holding portion 110 and the base 120 form the lid holder device 100 into one piece and are made of washable ceramic although the lid holder device 100 can be made of other suitable materials such as washable plastic or metal as well. The lid holder device 100 can have any suitable dimensions to accommodate any suitable number of one or more hot pot lids PL, ladles L and spatulas S. The base 120 is attached and disposed underneath the bottom collection portion 112 of the cupped holding portion 110 that supports the cupped holding portion 110.

While the present invention has been related in terms of the foregoing embodiments, those skilled in the art will recognize that the invention is not limited to the embodiments described. The present invention can be practiced with modification and alteration within the spirit and scope of the appended claims. Thus, the description is to be regarded as illustrative instead of restrictive on the present invention.

What is claimed is:

1. A monolithic lid holder device made of washable ceramic, comprising:

a cupped holding portion defining a periphery and having an upper portion and a bottom collection portion whereby said cupped holding portion curving upwardly and outwardly between said bottom collection portion and upper portion and having at least two curved indentures formed around the periphery, each of said curved indentures having a first width near the upper portion of the cupped holding portion and a second width near the bottom collection portion whereby the first width is greater than the second width and said curved indentures are positioned to hold and accommodate a pot lid and one or more other kitchen utensils in an upright position such that the pot lid is adapted to be inserted into the at least two indentures and adapted to rest on a downwardly curved bottom surface of each of the at least two indentures, said bottom collection portion defining a reservoir that is adapted to collect and contain condensation and material from said pot lid and said one or more kitchen utensils; and a base that is monolithically attached and disposed underneath said bottom collection portion of said cupped holding portion, said base supporting said cupped holding portion.

\* \* \* \* \*